United States Patent
Anagnos

(10) Patent No.: US 12,467,552 B2
(45) Date of Patent: Nov. 11, 2025

(54) VARIABLE FLOW CHARACTERISTIC VALVES

(71) Applicant: Fisher Controls International LLC, Marshalltown, IA (US)

(72) Inventor: Rich J. Anagnos, Conrad, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 68 days.

(21) Appl. No.: 18/525,150

(22) Filed: Nov. 30, 2023

(65) Prior Publication Data

US 2024/0093800 A1 Mar. 21, 2024

Related U.S. Application Data

(62) Division of application No. 17/080,335, filed on Oct. 26, 2020, now Pat. No. 11,867,310.

(51) Int. Cl.
*F16K 31/04* (2006.01)
*F16K 1/54* (2006.01)

(52) U.S. Cl.
CPC ............ *F16K 31/041* (2013.01); *F16K 1/54* (2013.01)

(58) Field of Classification Search
CPC .......... F16K 1/54; F16K 3/085; F16K 31/041; F16K 31/535
See application file for complete search history.

(56) References Cited

U.S. PATENT DOCUMENTS

| 3,424,200 | A | 1/1969 | Marley |
| 5,402,821 | A | 4/1995 | harstad |
| 5,417,083 | A | 5/1995 | Eber |
| 9,568,112 | B2 | 2/2017 | Walker |
| 10,865,896 | B2 * | 12/2020 | Zonneveld ............ F16K 27/045 |

FOREIGN PATENT DOCUMENTS

EP 0370557 A1 * 5/1990 ............... G01F 1/42

OTHER PUBLICATIONS

Emerson Process Management, "Low Flow Valves and Specialty Products," Baumann Inc., Oct. 2, 2002, 12 pages.
United States Patent and Trademark Office, "Requirement for Restriction / Election," issued in U.S. Appl. No. 17/080,335, on Jan. 25, 2022 (7 pages).
United States Patent and Trademark Office, "Non-Final Action" issued in U.S. Appl. No. 17/080,335, on Apr. 11, 2022 (10 pages).
United States Patent and Trademark Office, "Final Office Action" issued in U.S. Appl. No. 17/080,335, mailed on Aug. 10, 2022, (22 pages).

(Continued)

*Primary Examiner* — Eric Keasel
(74) *Attorney, Agent, or Firm* — Hanley, Flight & Zimmerman, LLC

(57) ABSTRACT

Variable flow characteristic valves are disclosed. A disclosed example valve for controlling a flow characteristic therethrough includes a first plate having a first aperture pattern, a second plate proximate the first plate, the second plate having a second aperture pattern, and a rotator to rotate the second plate relative to the first plate to vary a degree of alignment between the first and second aperture patterns.

10 Claims, 9 Drawing Sheets

(56) References Cited

OTHER PUBLICATIONS

United States Patent and Trademark Office, "Advisory Action" issued in U.S. Appl. No. 17/080,335, mailed on Oct. 14, 2022, (3 pages).
United States Patent and Trademark Office, "Non-Final Action" issued in U.S. Appl. No. 17/080,335, on Nov. 15, 2022 (22 pages).
United States Patent and Trademark Office, "Final Action" issued in U.S. Appl. No. 17/080,335, on May 19, 2023 (25 pages).
United States Patent and Trademark Office, "Notice of Allowance and Fee(s) Due," issued in connection with U.S. Appl. No. 17/080,335, mailed on Aug. 29, 2023, 9 pages.

* cited by examiner

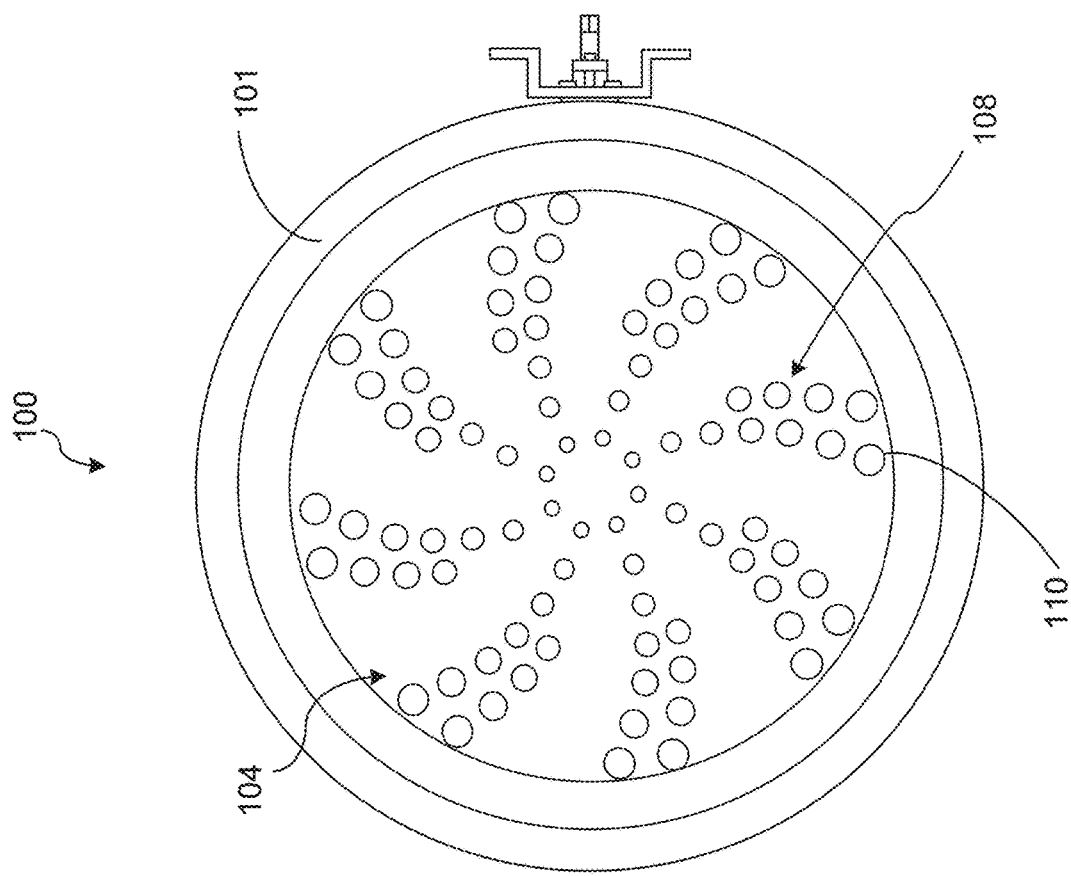
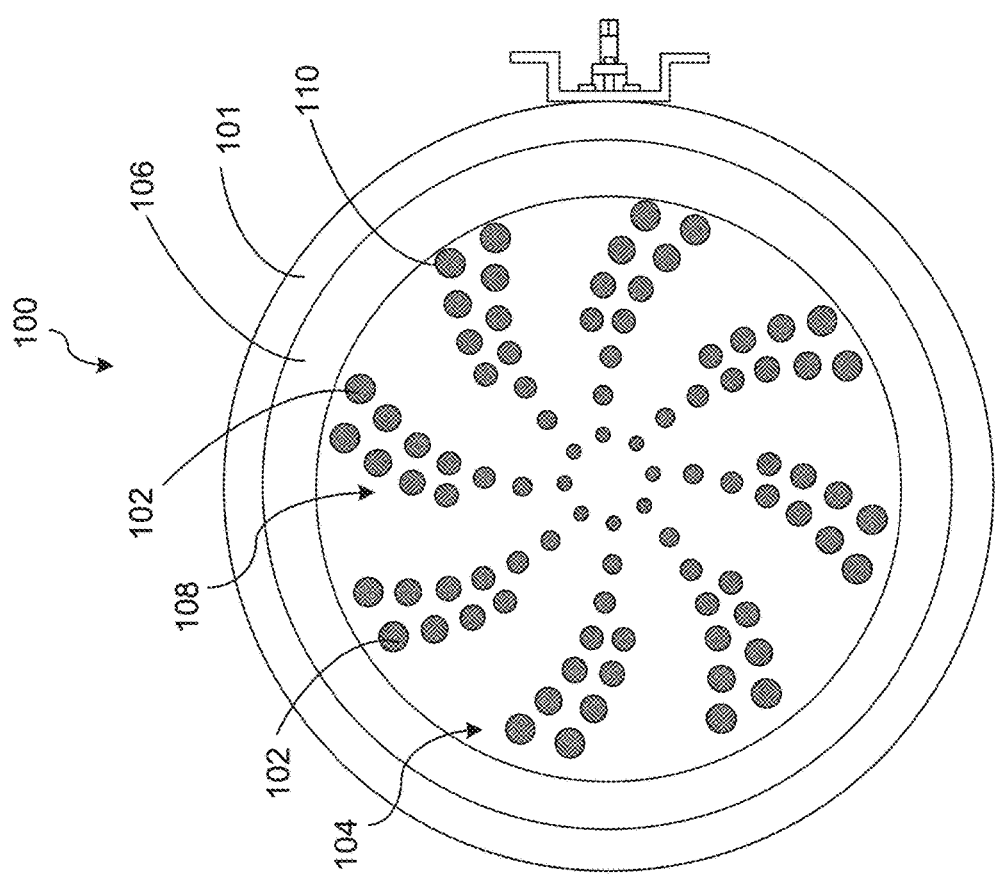
FIG. 1B
FIG. 1A

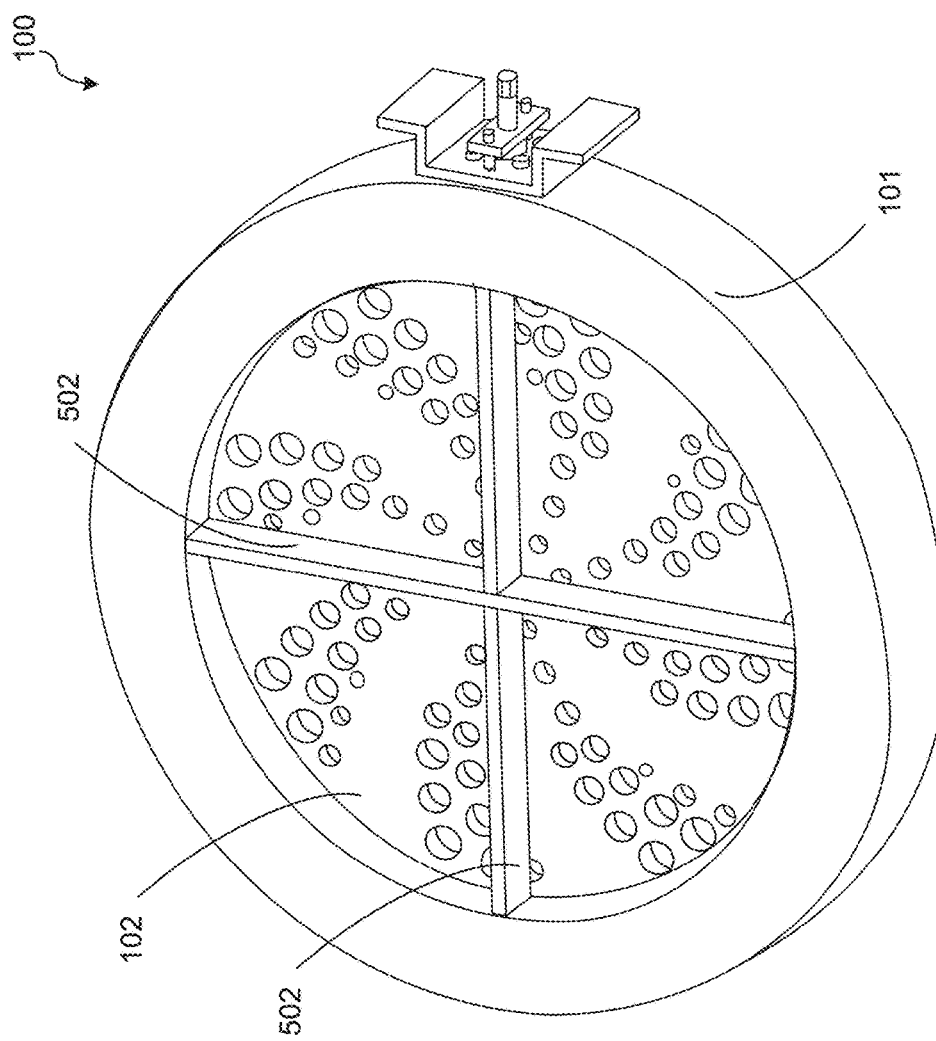

VARIABLE FLOW CHARACTERISTIC VALVES

RELATED APPLICATION

This patent arises from a divisional of U.S. patent application Ser. No. 17/080,335, which was filed on Oct. 26, 2020. U.S. patent application Ser. No. 17/080,335 is hereby incorporated herein by reference in its entirety. Priority to U.S. patent application Ser. No. 17/080,335 is hereby claimed.

FIELD OF THE DISCLOSURE

This disclosure relates generally to process control systems and, more particularly, to variable flow characteristic valves.

BACKGROUND

Some known industrial flow valves employ a plug that is moved by a valve stem relative to a valve seat to vary an amount of flow moving therethrough. However, the plugs can be subject to a high degree of wear based on cycling and loads. Further, moving the valve stem along with the plug can require a significant amount of energy, especially in an industrial application with a relatively high pressure and/or mass flow rate.

SUMMARY

An example valve for controlling a flow characteristic therethrough includes a first plate having a first aperture pattern, a second plate proximate the first plate, the second plate having a second aperture pattern, a rotator to rotate the second plate relative to the first plate to vary a degree of alignment between the first and second aperture patterns.

An example method includes determining a desired flow characteristic through a valve, the valve having a first plate including a first aperture pattern and a second plate including a second aperture pattern, the second plate proximate the first plate, and based on the desired flow characteristic, rotating the second plate relative to the first plate to vary a degree of alignment between the first and second aperture patterns.

An example non-transitory machine readable medium includes instructions, which when executed, cause at least one processor to determine a desired flow characteristic through a valve, the valve having a first plate including a first aperture pattern and a second plate including a second aperture pattern, the second plate proximate the first plate, and calculate a degree of rotational displacement of the second plate relative to the first plate based on a degree of alignment between the first and second aperture patterns, and the desired flow characteristic. The instructions further cause the at least one processor to cause the second plate to rotate relative to the first plate based on the calculated degree of rotational displacement.

An example apparatus includes means for varying a fluid flow having means for rotating a first plate with a first aperture pattern relative to a second plate with a second aperture pattern.

BRIEF DESCRIPTION OF THE DRAWINGS

FIGS. 1A and 1B are frontal views of an example valve in accordance with teachings of this disclosure.

FIG. 5 is a rear perspective view of the example valve of FIGS. 1A-4.

Figure 2:
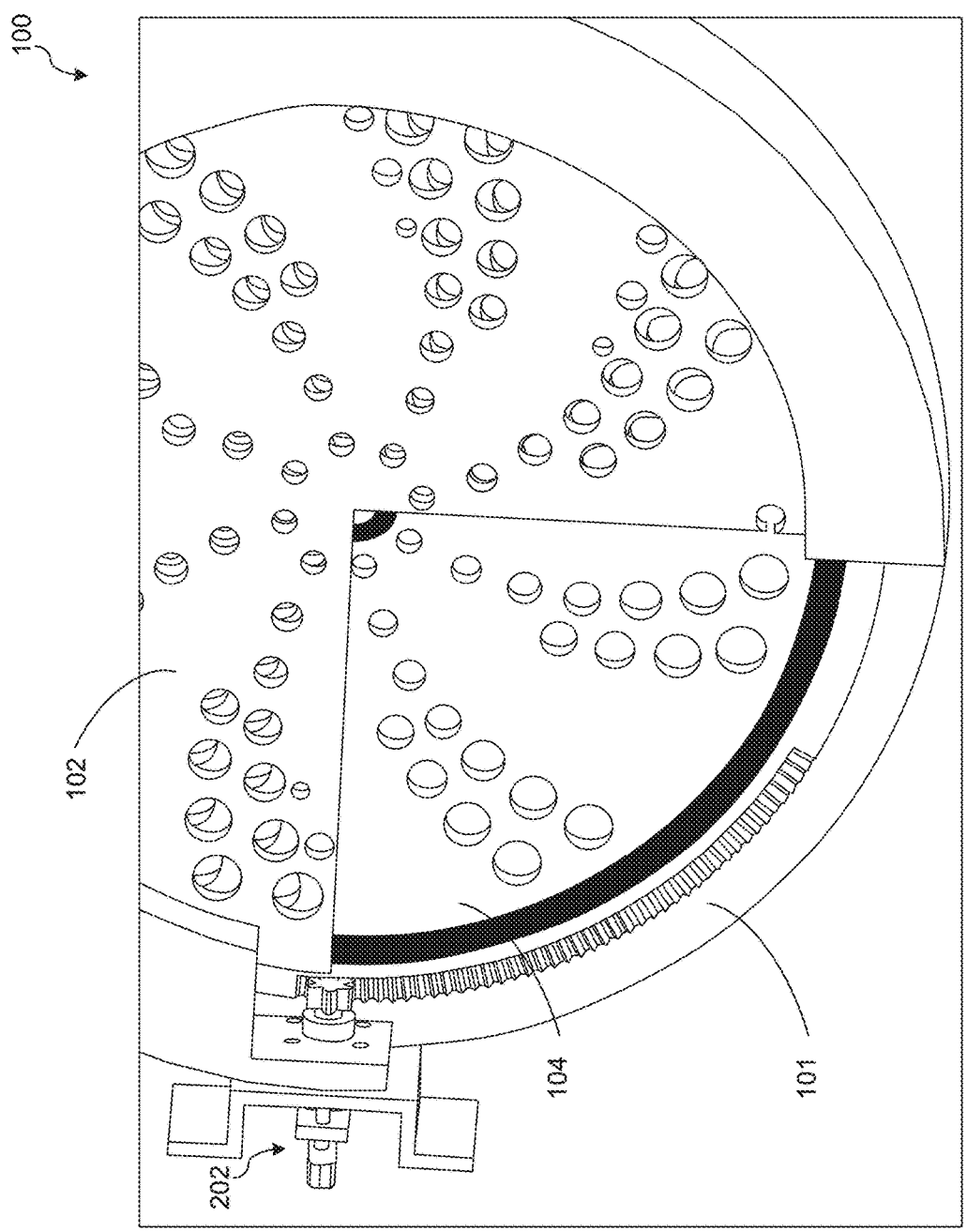
FIG. 2 is a partial cutaway perspective view of the example valve of FIGS. 1A and 1B.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Variable flow characteristic valves are disclosed. Some known industrial flow valves employ a plug that is moved by a valve stem relative to a valve seat. However, the plug can be subject to a high degree of wear based on cycling and loads. Further, moving the plug can require a significant amount of energy, especially in an industrial setting in which relatively large mass flow rates or pressures are common.

Examples disclosed herein provide an energy-efficient, highly adaptable and relatively low cost implementation for valves. Examples disclosed herein can be implemented to adjust a flow characteristic (e.g., a characteristic flow curve, a characteristic pressure drop, a mass flow rate, etc.) based on at least one movable flow control plate (e.g., a multi-port plate). Examples disclosed herein utilize a first plate having a first aperture pattern and a second plate having a second aperture pattern. The second plate is positioned adjacent and in parallel with the first plate, for example. A rotator rotates the second plate relative to the first plate to vary a degree of alignment and/or overlap between the first and second aperture patterns and, in turn, a flow characteristic (e.g., a flow rate, a characteristic flow curve, etc.) through the valve is controlled and/or adjusted.

In some examples, at least one of the first or second aperture patterns includes a spiral pattern. In some examples, the first and second aperture patterns are identical. In other examples, the first and second aperture patterns are different. In some examples, the rotator includes a first gear operatively coupled to a gear shaft, and a second gear operatively coupled to the second plate, where the first gear is to interface with the second gear to rotate the second gear and, thus, the second plate. Additionally or alternatively, a bearing is operatively coupled between the first and second plates.

FIGS. 1A and 1B are frontal views of an example valve (e.g., an adjustable multi-port valve, a valve trim, a valve component, a means for varying a fluid flow, etc.) 100 in accordance with teachings of this disclosure shown in restricted and open states, respectively. Turning to FIG. 1A, the example valve 100 is shown in a restricted or closed state and includes a housing 101 along with a first plate (e.g., a stationary plate) 102 and a second plate (e.g., a rotatable plate, a movable plate, an adjustable plate, etc.) 104. The example valve 100 also includes a retainer (e.g., a retaining ring) 106. In this example, the first plate 102 is positioned in behind of the second plate 104 in the view of FIG. 1A and the first plate 102 is downstream from the second plate 104. In other examples, the first plate 102 is upstream from the second plate 104. In this example, the second plate 104 has an aperture pattern 108 with apertures 110 blocked by and/or overlapping with the first plate 102. In this example, the restricted or closed state still enables some fluid to flow through the valve 100.

FIG. 1B depicts the example valve 100 in a relatively open state in which the apertures 110 are not obstructed by the first plate 102 (shown in FIG. 1A) and, thus, fluid is allowed to more freely flow therethrough. In contrast to the example of FIG. 1A, the flow of fluid through the valve 100 in the open state corresponds to a maximum flow rate of the valve 100, for example.

In operation, rotational movement of the second plate 104 relative to the first plate 102 enables flow through the valve 100 to be controlled and/or adjusted. In other words, rotation of the second plate 104 relative to the first plate 102, which is held stationary by the housing 101, adjusts a flow characteristic of fluid moving through the valve 100. In the illustrated example, the second plate 104 is rotated relative to the first plate 102 such that an axis of rotation of the second plate 104 is aligned with a center (e.g., a geometric center) of the first plate 102. In other examples, the axis of rotation and the center can be offset from one another. Further, the aperture pattern 108 of the second plate 104 includes a spiral pattern with the apertures 110 positioned in a spiraling fan blade-like arrangement. In this example, the apertures 110 increase in diameter along a direction away from a radial center of the second plate 104. However, in other examples, the apertures 110 may all have an identical diameter or decrease in radius away from the radial center of the second plate 104. In the illustrated example, the first plate 102 includes an identical spiral aperture pattern to the aperture pattern 108 of the first plate 102. In other examples, the aperture pattern of the first plate 102 is different from the aperture pattern 108. In this example, both the first plate 102 and the second plate 104 exhibit a flat circular shape (e.g., a flat disc). However, the first plate 102 and the second plate 104 can be any appropriate shape or outline (e.g., rectangular shaped, triangle shaped, oval shaped, etc.).

In some examples, at least one of the apertures 110 of the second plate 104 is aligned to an aperture of the first plate 102 at any rotation of the second plate 104 relative to the first plate 102. In some other examples, the first plate 102 is not stationary or fixed to the retainer 106 and/or the housing 101 and can be rotated relative to the second plate 104. In some such examples, the first plate 102 and the second plate 104 are both rotated relative to the housing 101 to control a flow rate through the valve 100.

FIG. 2 is a partial cutaway perspective view of the example valve 100 of FIGS. 1A and 1B. In the illustrated view of FIG. 2, portions of the first plate 102 and the housing 101 are removed for clarity. As can be seen in the illustrated example of FIG. 1B, the aperture pattern of the second plate 104 is identical to that of the first plate 102. As will be described in greater detail below in connection with FIG. 4, a rotator (e.g., a means for rotating a first plate relative to a second plate, a rotational assembly, a driving assembly, etc.) 202 causes rotational displacement of the second plate 104 relative to the first plate 102.

Figure 3:
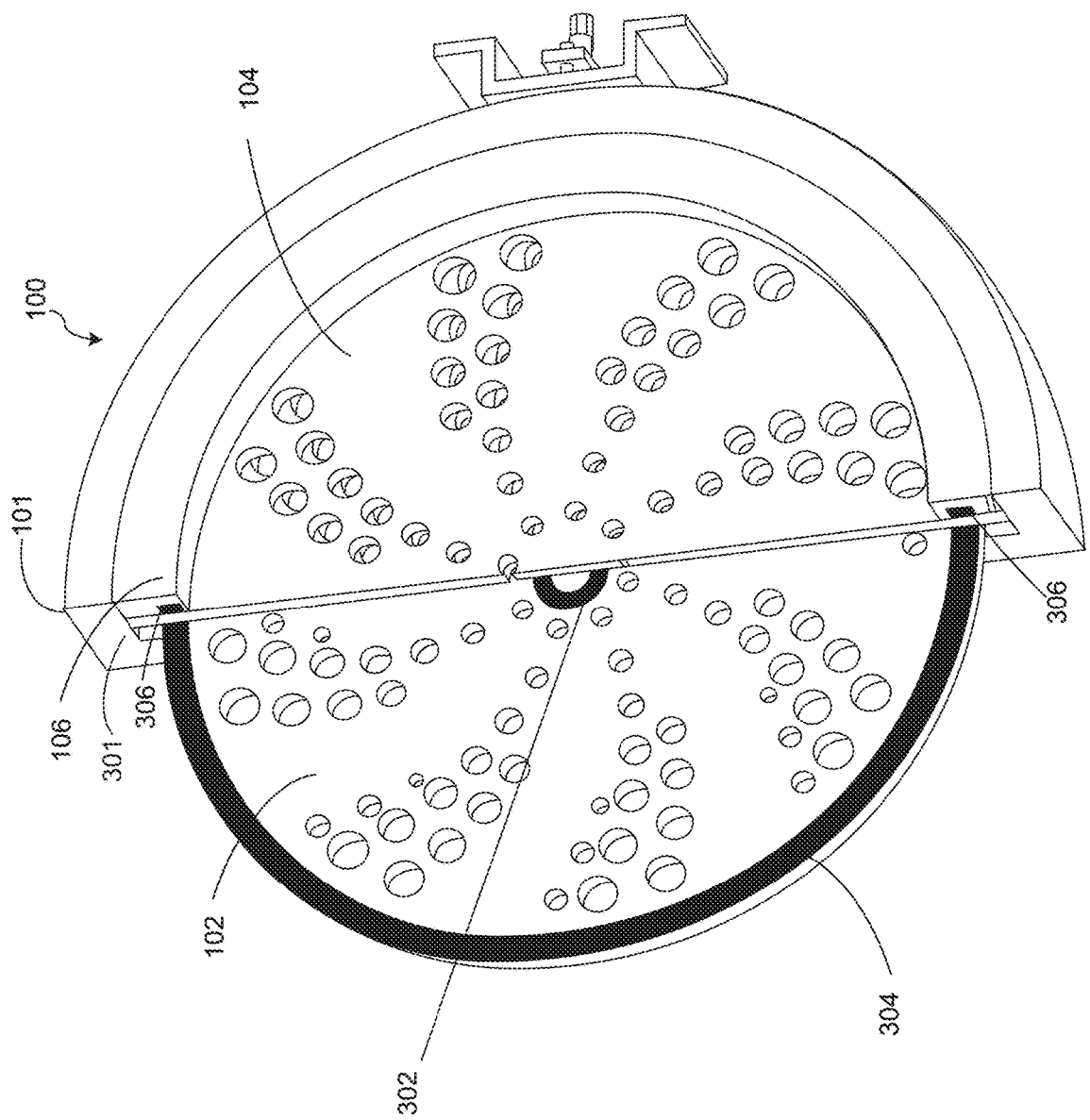
FIG. 3 is another partial cutaway perspective view of the example valve of FIGS. 1A-2.

FIG. 3 is another partial cutaway perspective view of the example valve 100 of FIGS. 1A-2. In the illustrated example, the first plate 102 and the second plate 104 are shown at least partially positioned or disposed within the housing 101 and/or the retainer 106. For example, an outer diameter portion of the first plate 102 is positioned within a c-shaped channel 301 defined by the housing 101 and the retainer 106. Further, the outer diameter portion of the first plate 102 is rigidly coupled (e.g., bonded, welded, adhered, etc.) to the housing 101 (e.g., via fasteners, welds, chemical coupling, etc.). Similarly, an outer diameter portion of the second plate 104 is also positioned within and/or surrounded by the c-shaped channel 301. The example second plate 104 is positioned adjacent and parallel to (i.e., parallel from a flow perspective) the first plate 102 and has a larger diameter than the first plate 102.

To facilitate rotation of the second plate 104 relative to the first plate 102, the valve 100 includes bearings (e.g., ring-shaped bearing assemblies, roller bearings, needle bearings, etc.) 302, 304 operatively coupled between the first plate 102 and the second plate 104 and a bearing (e.g., ring-shaped bearing assemblies, roller bearings, needle bearings, etc.) 306 operatively coupled between the second plate 104 and the retainer 106. In this example, the bearing 302 is positioned proximate a center of the second plate 104 while the bearings 304, 306 are positioned proximate an outer diameter of the second plate 104.

In some examples, at least one of the bearings 302, 304, 306 is implemented as a roller bearing. In some examples, at least one sealing gasket or O-ring is positioned between the first plate 102, the second plate 104 and/or the housing 101 to seal at least a portion of the valve 100. As mentioned above, the housing 101 and the retainer 106 define a generally c-shaped cross-sectional profile (e.g., a c-shaped panel). However, any appropriate cross-sectional profile can be implemented instead.

Figure 4:
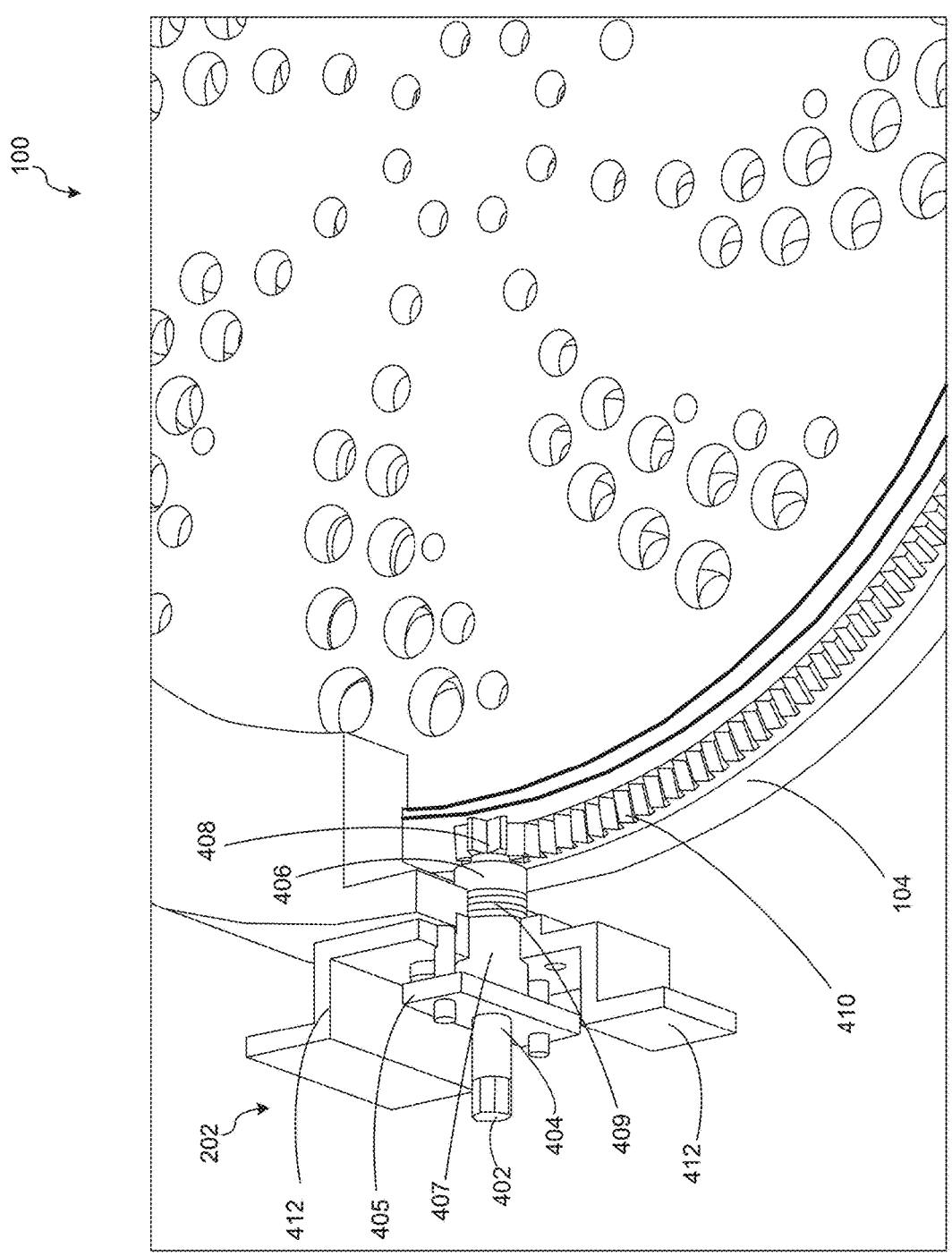
FIG. 4 is yet another partial cutaway perspective view of the example valve of FIGS. 1A-3.

FIG. 4 is yet another partial cutaway perspective view of the example valve 100 of FIGS. 1A-3. In the illustrated view of FIG. 4, an example movement mechanism of the rotator 202 of the valve 100 is shown. However, any appropriate type of movement mechanism can be implemented instead. The rotator 202 of the illustrated example includes an input (e.g., an input, a crank) 402, a shaft (e.g., a gear shaft) 404, a packing flange 405, a bushing 406, a packing follower 407, a gear 408, and packing 409. Further, the second plate 104 includes a gear (e.g., a tooth gear) 410. In the illustrated example, the rotator 202 includes and/or is supported/positioned by brackets 412.

In the illustrated example, rotation of the input 402 causes rotation of the shaft 404 relative to the packing flange 405 and, in turn, causes the gear 408 to engage and rotate the gear 410, thereby rotating the second plate 104. In other words, rotation of the input 402 causes the second plate 104 to be rotated relative to the first plate 102 while the first plate 102 remains stationary relative to the housing 101.

FIG. 5 is a rear perspective view of the example valve 100 of FIGS. 1A-4. In this example, the valve 100 and/or the housing 101 includes support beams 502. The example support beams 502 can be implemented to reinforce the first plate 102 and/or the second plate 104 (not shown in FIG. 5). In some examples, the support beams 502 are removably couplable (e.g., via a snap fit, snap-in retainers, etc.) from the housing 101. Additionally or alternatively, the first plate 102, the support beams 502 and/or the housing 101 are coupled or fixed (e.g., welded, bonded, adhered, etc.) together. In other examples, the support beams 502 are not implemented.

FIGS. 6A-6D depict alternative aperture patterns 600, 610, 620, 630, respectively. The example aperture patterns 600, 610, 620, 630 can be implemented in examples disclosed herein. Particularly, the aforementioned aperture 600, 610, 620, 630 patterns can be implemented in the first plate 102 and/or the second plate 104.

Figure 6A:
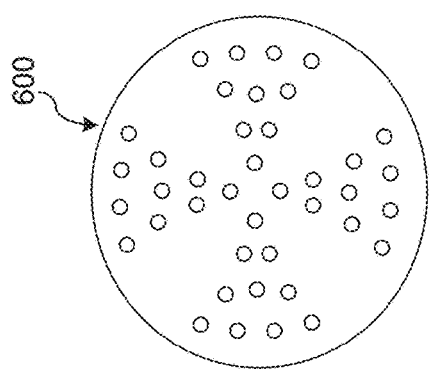
FIGS. 6A-6D depict alternative example aperture patterns that can be implemented in examples disclosed herein.

FIG. 6A depicts the example aperture pattern 600, which resembles diverging triangles that are spaced at 90 degree intervals. The example aperture pattern 600 can vary a flow range of the valve 100 in 90 degree rotational increments of rotational displacement, for example.

Figure 6B:
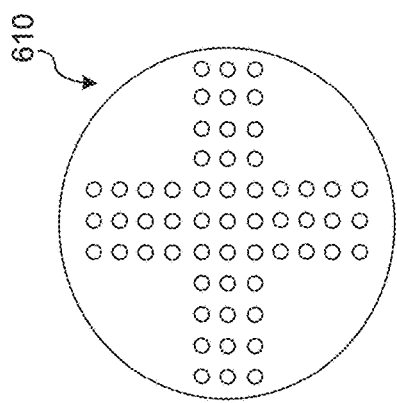

FIG. 6B depicts the example aperture pattern 610, which resembles a cross or a plus symbol shape (e.g., a cross-shaped pattern, apertures arranged in a pattern resembling a "+" symbol).

Figure 6C:
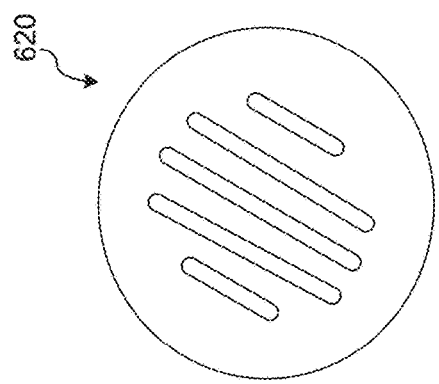

FIG. 6C depicts an example aperture pattern 620 with elongated slots. In this example, at least some of the elongated slots have different lengths. In other examples, the slots may be of the same length (e.g., longitudinally arranged in parallel).

Figure 6D:
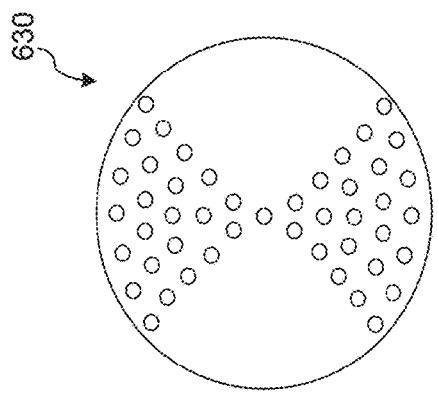

FIG. 6D depicts the example aperture pattern 630. The aperture pattern 630 is similar to the example aperture pattern 600 of FIG. 6A, but extends from a single diametric axis instead of two.

The example aperture patterns in FIGS. 1-6D are only examples and any appropriate aperture pattern shapes or combinations thereof can be implemented instead. Any combination of aperture patterns can be implemented (e.g., a first plate includes the aperture pattern 620 while a second plate adjacent the first plate includes the aperture pattern 630). Further, any aperture pattern arrangement can be implemented instead (e.g., square, rectangle, triangle, pentagon, hexagon, star, oval, etc.). In some examples, slot-like and/or oval aperture shapes are utilized instead.

Figure 7:
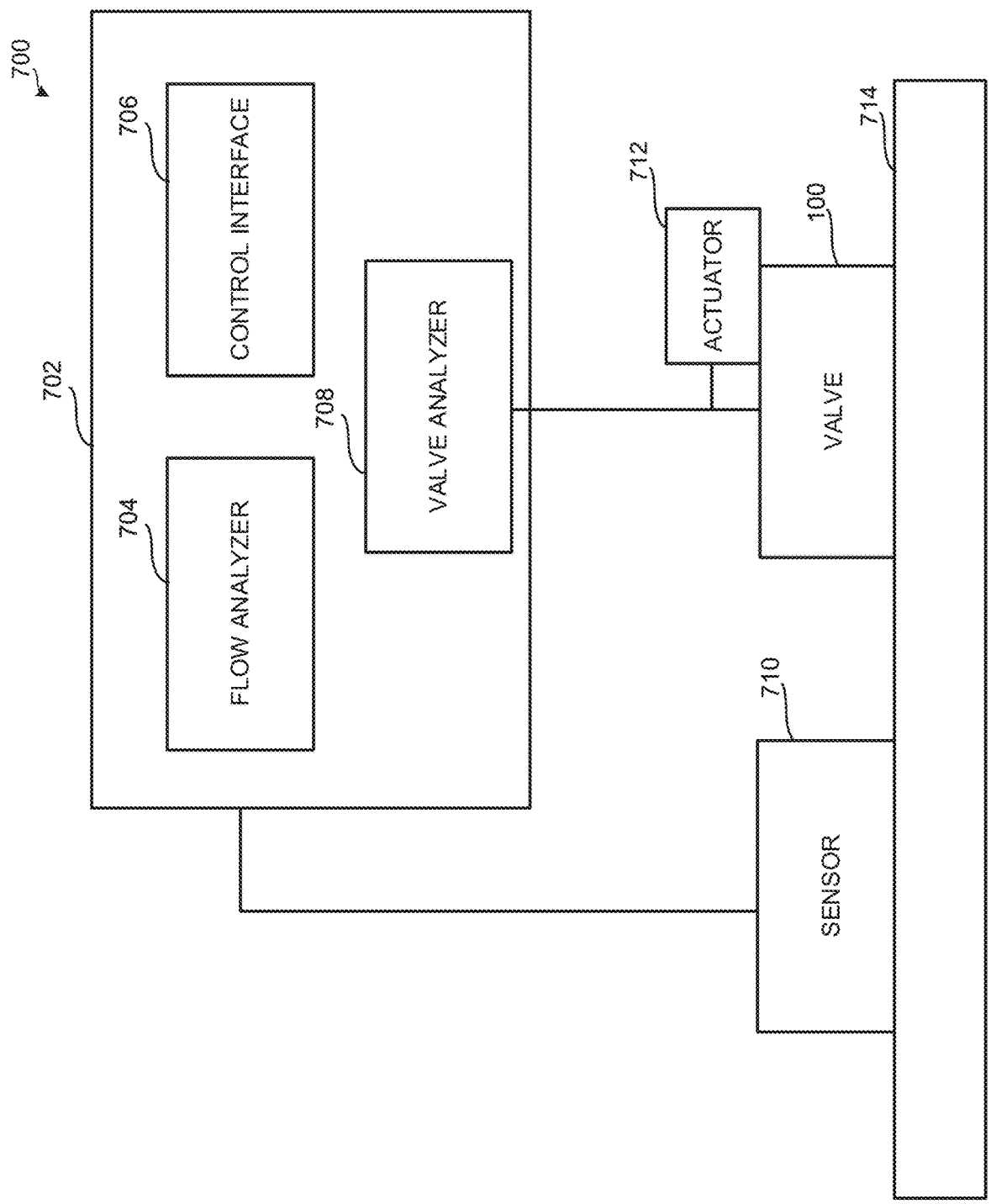
FIG. 7 is a schematic overview of an example valve control system that can be implemented in examples disclosed herein.

FIG. 7 is a schematic overview of an example valve control system 700 that can be implemented in examples disclosed herein. The valve control system 700 of the illustrated example includes a valve controller 702 which, in turn, includes a flow analyzer 704, a control interface 706, and a valve analyzer 708. In this example, the valve controller 702 is operatively coupled to a sensor 710 and the example valve 100. In some examples, the valve analyzer 708 is communicatively coupled to the valve 100 and/or an actuator 712 associated with the valve 100. Further, the sensor 710 and the valve 100 are operatively coupled to a pipe (e.g., a fluid pipe) 714. In particular, the sensor 710 measures data corresponding to the pipe 714 while the actuator 712 controls the valve 100 to change and/or adjust an amount of flow (e.g., a flow rate, a mass flow rate, etc.) or flow characteristic of fluid moving through the pipe 714.

The example flow analyzer 704 receives sensor data from the sensor 710. In this example, the sensor 710 measures a flow rate within the pipe 714. Additionally or alternatively, the sensor 710 measures flow characteristics of fluid moving through the pipe 714 at different angular rotations (e.g., rotational displacements) of the second plate 104.

In the illustrated example, the valve analyzer 708 determines an adjustment of the valve 100 to change a flow characteristic of the valve 100. In this example, the valve analyzer 708 determines and/or calculates a rotational adjustment and/or movement of the second plate 104 to set the valve 100 to a desired setpoint based on the sensor data (e.g., a measured flow rate, measured flow characteristic behavior) from the flow analyzer 704 and/or the sensor 710. In this example, the valve analyzer calculates a rotational adjustment of the second plate 104 to direct the actuator 712 to set the valve 100 at the desired setpoint. The rotational adjustment of the second plate 104 may be based on a calculated degree of alignment and/or overlap of openings (e.g., the apertures 110) of the second plate 104 with openings (e.g., apertures) of the first plate 102. In other words, the valve analyzer 708 can determine a relative rotation of the second plate 104 to the first plate 102 corresponding to the desired setpoint, for example.

The example control interface 706 controls the actuator 712 and, in turn, the valve 100 and/or other devices associated with the valve 100 and/or the pipe 714. In this example, the control interface 706 controls an actuator 712 or a solenoid operatively coupled to the input 402 of the rotator 202 to rotate the second plate 104 relative to the first plate 102.

While an example manner of implementing the valve control system 700 of FIG. 7 is illustrated in FIG. 7, one or more of the elements, processes and/or devices illustrated in FIG. 7 may be combined, divided, re-arranged, omitted, eliminated and/or implemented in any other way. Further, the example flow analyzer 704, the example control interface 706, the example valve analyzer 708 and/or, more generally, the example valve control system 700 of FIG. 7 may be implemented by hardware, software, firmware and/or any combination of hardware, software and/or firmware. Thus, for example, any of the example flow analyzer 704, the example control interface 706, the example valve analyzer 708 and/or, more generally, the example valve control system 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example flow analyzer 704, the example control interface 706, and/or the example valve analyzer 708 is/are hereby expressly defined to include a non-transitory computer readable storage device or storage disk such as a memory, a digital versatile disk (DVD), a compact disk (CD), a Blu-ray disk, etc. including the software and/or firmware. Further still, the example valve control system 700 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
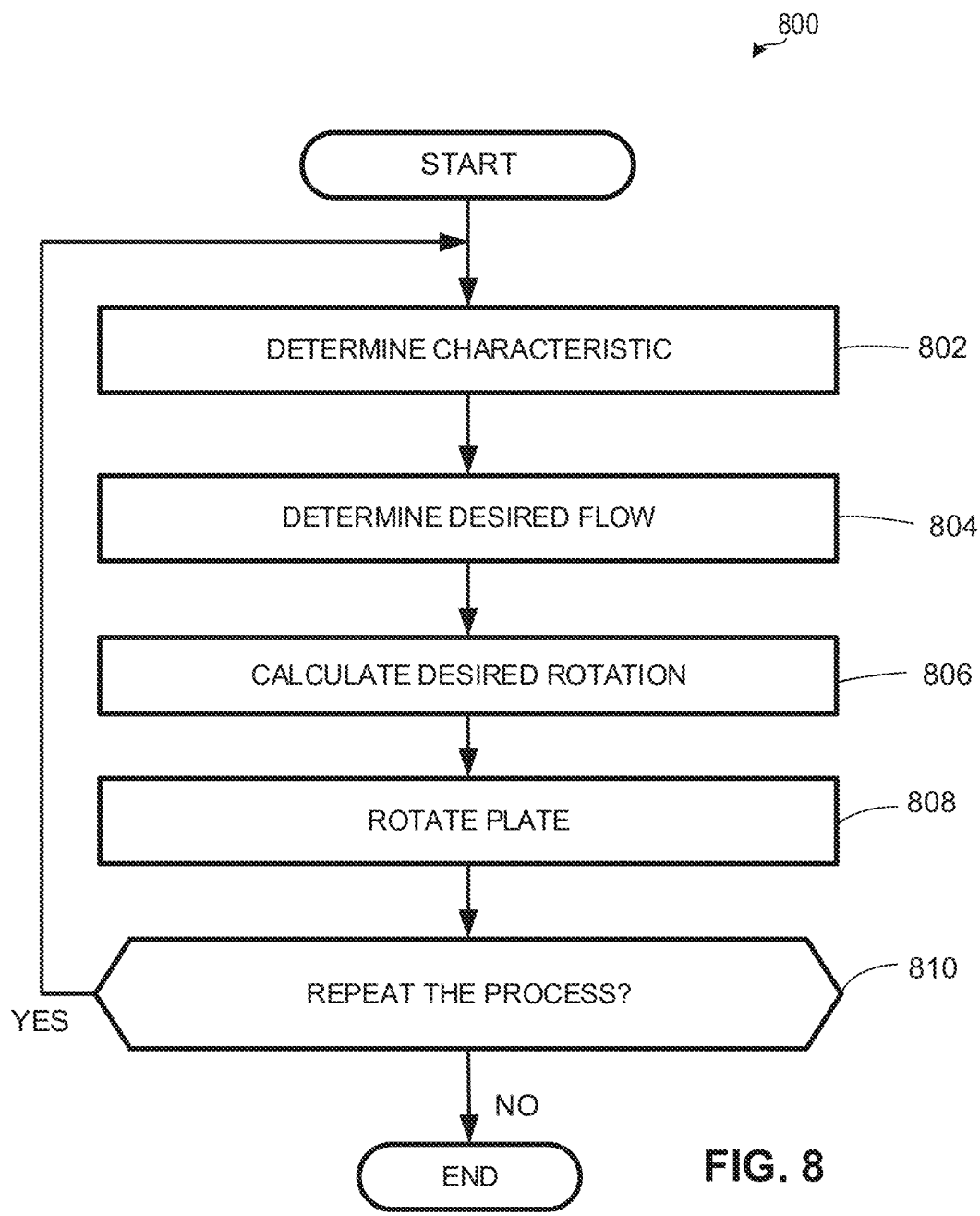
FIG. 8 is a flowchart representative of machine readable instructions which may be executed to implement examples disclosed herein.

A flowchart representative of example hardware logic, machine readable instructions, hardware implemented state machines, and/or any combination thereof for implementing the valve control system 700 of FIG. 7 is shown in FIG. 8. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example valve control system 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example process of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 800 begins as the valve 100 is being operated. In this example, a fluid is flowing through the pipe 714. Accordingly, a flow characteristic (e.g., a flow rate, a flow curve, etc.) of the fluid flowing the pipe 714 is to be controlled by adjusting the valve 100 to a setpoint via a rotational adjustment of the second plate 104.

At block 802, the flow analyzer 704 determines a flow characteristic (e.g., a flow rate, a characteristic flow curve, etc.) of the fluid moving through the pipe 714 and/or the valve 100. In this example, the determination of the flow characteristic is based on data from the example sensor 710. In some examples, the flow analyzer 704 determines the flow characteristic through the pipe 714 and/or the valve 100 in relationship to a rotational angle and/or displacement of the second plate 104 (e.g., a rotational displacement between the second plate 104 and the first plate 102).

At block 804, the flow analyzer 704 and/or the valve analyzer 708 determines a desired flow (e.g., a desired flow characteristic) through the pipe 714. In this example, the desired flow includes a desired flow rate of fluid moving through the pipe 714. This desired flow may be based on inputs received from a user and/or a process control system.

At block 806, the valve analyzer 708 calculates a desired rotation of the second plate 104 based on the desired flow. The desired rotation can be calculated based on a relative alignment and/or an overlap in aperture patterns of the first and second plates 102, 104. For example, the relative alignment and/or overlap can be correlated with flow rates through the valve 100 and/or the pipe 714 at different rotational displacements of the second plate 104 relative to the first plate 102.

At block 808, the valve analyzer 708 and/or the control interface 706 causes the actuator 712, motor and/or solenoid operatively coupled to the rotator 202 to rotate the second plate 104.

At block 810, it is determined whether to repeat the process. If the process is to be repeated (block 810), control of the process returns to block 802. Otherwise, the process ends.

Figure 9:
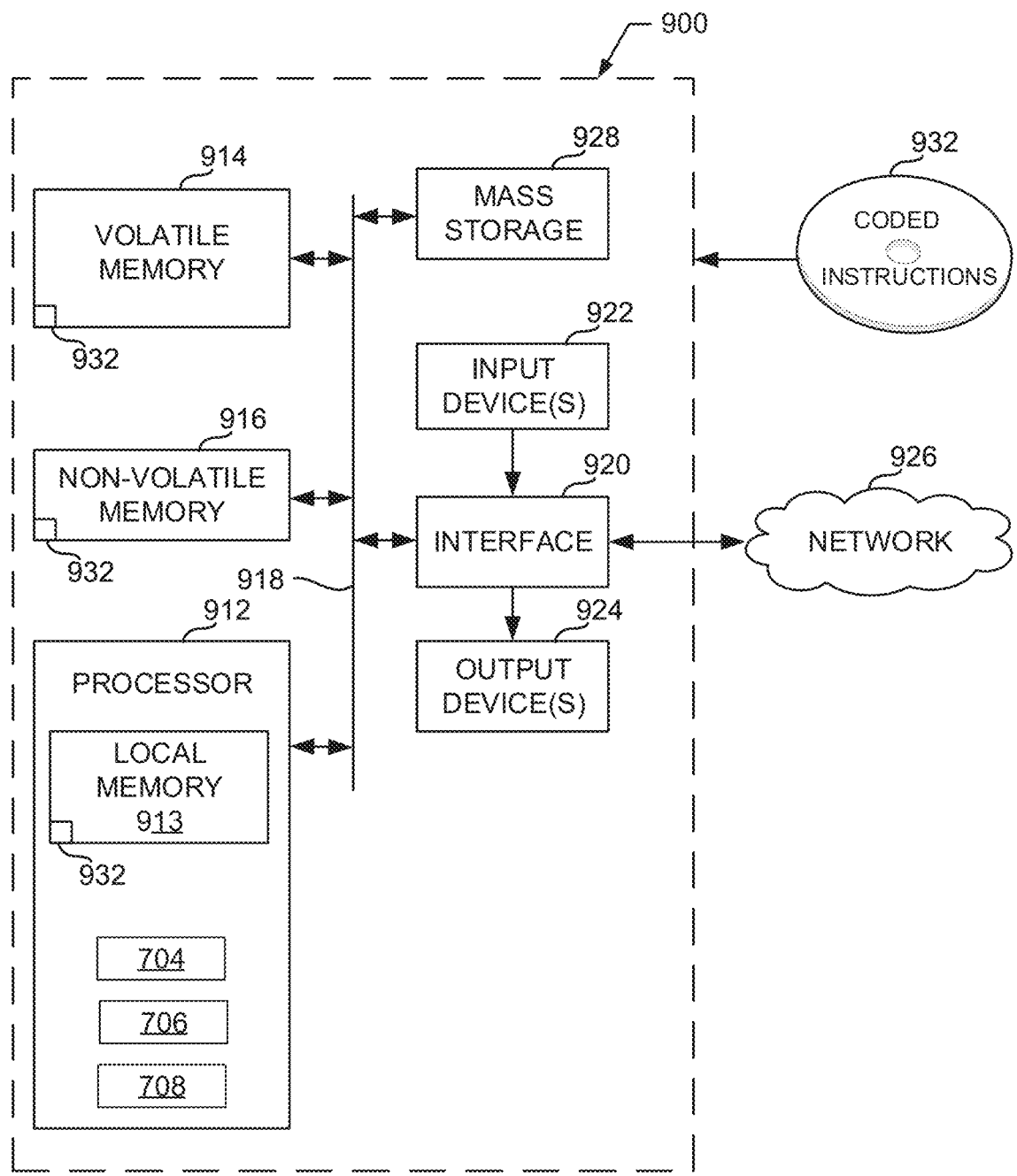
FIG. 9 is a block diagram of an example processing platform structured to execute the instructions of FIG. 8 to implement the example valve control system of FIG. 7.

FIG. 9 is a block diagram of an example processor platform 900 structured to execute the instructions of FIG. 8 to implement the valve control system 700 of FIG. 7. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flow analyzer 704, the example control interface 706 and the example valve analyzer 708.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that enable accurate, reliable, cost-effective and power-efficient control of valves.

Example 1 includes a valve for controlling a flow characteristic therethrough. The valve includes a first plate having a first aperture pattern, a second plate proximate the first plate, the second plate having a second aperture pattern, a rotator to rotate the second plate relative to the first plate to vary a degree of alignment between the first and second aperture patterns.

Example 2 includes the valve as defined in example 1, wherein at least one of the first or second aperture patterns includes a spiral pattern.

Example 3 includes the valve as defined in any of examples 1 or 2, wherein at least one of the first or second aperture patterns includes a cross-shaped pattern.

Example 4 includes the valve as defined in any of examples 1 to 3, wherein the first aperture pattern is identical to the second aperture pattern.

Example 5 includes the valve as defined in any of examples 1 to 4, wherein the rotator includes a first gear operatively coupled to a gear shaft, and a second gear operatively coupled to the second plate, the first gear to interface with the second gear to rotate the second gear.

Example 6 includes the valve as defined in any of examples 1 to 5, further including a bearing operatively coupled between the first and second plates.

Example 7 includes the valve as defined in any of examples 1 to 6, further including a housing rigidly coupled to the first plate.

Example 8 includes the valve as defined in example 7, wherein at least one of a retainer or the housing defines a c-shaped channel to surround at least a portion of an outer diameter of the first plate and at least a portion of an outer diameter of the second plate.

Example 9 includes a method including determining a desired flow characteristic through a valve, the valve having a first plate including a first aperture pattern and a second plate including a second aperture pattern, the second plate proximate the first plate, and based on the desired flow characteristic, rotating the second plate relative to the first plate to vary a degree of alignment between the first and second aperture patterns.

Example 10 includes the method as defined in example 9, further including calculating, by instructions executed with at least one processor, the degree of alignment between the first and second aperture patterns.

Example 11 includes the method as defined in example 10, further including calculating, by instructions executed with the at least one processor, a flow rate through the valve based on the degree of alignment.

Example 12 includes the method as defined in any of examples 9 to 11, wherein rotating the second plate relative to the first plate includes rotating a gear shaft with a first gear that engages a second gear of the second plate.

Example 13 includes the method as defined in example 12, wherein the gear shaft is rotated by at least one of an actuator, a solenoid, a motor or a handwheel.

Example 14 includes the method as defined in example 13, wherein during rotation of the gear shaft, the gear shaft is supported by a retainer including a c-shaped channel to surround at least a portion of an outer diameter of the first plate and at least a portion of an outer diameter of the second plate.

Example 15 includes the method as defined in any of examples 9 to 14, further including calculating, by instructions executed with at least one processor, a degree of overlap between the first and second aperture patterns, and wherein the second plate is rotated at least partially based on the degree of overlap.

Example 16 includes a non-transitory machine readable medium that include instructions, which when executed, cause at least one processor to determine a desired flow characteristic through a valve, the valve having a first plate including a first aperture pattern and a second plate including a second aperture pattern, the second plate proximate the first plate, and calculate a degree of rotational displacement of the second plate relative to the first plate based on a degree of alignment between the first and second aperture patterns, and the desired flow characteristic. The instructions further cause the at least one processor to cause the second plate to rotate relative to the first plate based on the calculated degree of displacement.

Example 17 includes the non-transitory machine readable medium as defined in example 16, wherein the at least one processor is further caused to calculate the degree of alignment between the first and second aperture patterns.

Example 18 includes the non-transitory machine readable medium as defined in any of examples 16 or 17, wherein the at least one processor is further caused to calculate a degree of overlap between the first and second aperture patterns.

Example 19 includes the non-transitory machine readable medium as defined in any of examples 16 to 18, wherein the at least one processor is further caused to calculate a flow rate through the valve based on the degree of alignment.

Example 20 includes an example apparatus including means for varying a fluid flow having means for rotating a first plate with a first aperture pattern relative to a second plate with a second aperture pattern.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system for use with a valve, the system comprising:
   a sensor interface communicatively coupled to a sensor, the sensor to measure a flow characteristic corresponding to the valve;
   machine readable instructions;
   programmable circuitry to execute the instructions to determine, based on the measured flow characteristic, a degree of overlap between:
     a first aperture pattern of a first plate, the first plate at a first longitudinal position of the valve, and
     a second aperture pattern of a second plate, the second plate at a second longitudinal position of the valve different from the first longitudinal position; and
   a control interface communicatively coupled to an actuator, the control interface to cause the actuator to move at least one of the first plate or the second plate based on the determined degree of overlap.

2. The system as defined in claim 1, wherein the degree of overlap is determined based on at least one of a desired flow characteristic of the valve or a setpoint of the valve.

3. The system as defined in claim 1, wherein the measured flow characteristic corresponds to a flow rate of the valve.

4. The system as defined in claim 1, wherein the actuator is to move the first plate and the second plate.

5. The system as defined in claim 1, wherein the programmable circuitry is to determine the degree of overlap based on an alignment of the first aperture pattern to the second aperture pattern.

6. The system as defined in claim 1, wherein the control interface is to cause the actuator to change a degree of rotational displacement between the first and second plate, and wherein the flow analyzer is to characterize the measured flow characteristics with respect to the degree of rotational displacement.

7. The system as defined in claim 1, wherein the programmable circuitry is to determine a degree of overlap between first apertures of the first aperture pattern and second apertures of the second aperture patterns.

8. The system as defined in claim 1, wherein the programmable circuitry is to calculate a flow rate through the valve based on the degree of overlap.

9. The system as defined in claim 1, wherein the programmable circuitry is to determine the degree of overlap based on flow characteristic behavior of the valve.

10. The system as defined in claim 1, wherein the control interface is to cause the actuator to vary a rotational displacement between the first and second plates.

* * * * *